| United States Patent [19] | [11] Patent Number: 5,076,941 |
| Boffardi et al. | [45] Date of Patent: Dec. 31, 1991 |

[54] MONOFLUOROPHOSPHATE SOLUBILITY INHIBITOR FOR LEAD IN POTABLE WATER SOURCES

[75] Inventors: Bennett P. Boffardi, Bethel Park; Ann M. Sherbondy, McDonald, both of Pa.

[73] Assignee: Calgon Corp., Pittsburgh, Pa.

[21] Appl. No.: 597,659

[22] Filed: Oct. 15, 1990

[51] Int. Cl.$^5$ ................................................ C02F 1/68
[52] U.S. Cl. .................................... 210/753; 252/387; 422/7; 422/14; 422/18; 210/697; 106/14.05; 106/14.12
[58] Field of Search ............... 210/696, 697, 698, 699, 210/753, 912; 252/175, 387; 422/7, 14, 18; 424/601, 606, 676; 106/14.05, 14.12

[56] References Cited

U.S. PATENT DOCUMENTS

| 4,561,981 | 12/1985 | Characklis | 210/696 |
| 4,613,450 | 9/1986 | Moran et al. | 106/14.12 |
| 4,737,356 | 4/1988 | O'Hara et al. | 210/912 |

*Primary Examiner*—Stanley S. Silverman
*Assistant Examiner*—Neil M. McCarthy
*Attorney, Agent, or Firm*—Raymond M. Speer; Hesna J. Pfeiffer

[57] ABSTRACT

Monofluorophosphate salts, especially sodium monofluorophosphate ($Na_2PO_3F$), when added to potable water sources in concentrations between 0.1 mg/L and 500 mg/L, significantly reduces lead (Pb) leaching into said water, producing the double benefit of reducing lead solubility and thus content in drinking water, while at the same time adding fluoride to that drinking water, with the anticaries benefit that fluoridation provides.

5 Claims, No Drawings

MONOFLUOROPHOSPHATE SOLUBILITY INHIBITOR FOR LEAD IN POTABLE WATER SOURCES

BACKGROUND OF THE INVENTION

1. Field of the Invention

The present invention is in the field of methods for preventing or reducing levels of lead in potable water sources, i.e., drinking water. It has long been known that there is a strong link between lead contamination in drinking water and adverse health effects in humans. Even at levels below the maximum contaminant level goals set by the U.S. Environmental Protection Agency set pursuant to the Safe Drinking Water Act passed by Congress in 1974, lead can cause serious damage to the brain, kidneys, nervous system and red blood cells. Proposed regulations may set maximum contaminant levels for lead as low as 20 μg/L of drinking water, which is 20 part per billion (ppb).

Elevated blood-lead levels have long been linked to a wide range of deleterious health effects, particularly among young children; and severe retardation and even death at very high levels (80–100 μg/dL) can result. There is a negative impact of lead on cognitive performance as measured by IQ tests and school performance which occurs at moderate-to-high blood-lead levels (30–40 μg/dL). Lead has also long been associated with elevated blood pressure, hypertension, strokes and heart attacks in adults.

Lead in the drinking water supply is not from the source water per se; the majority of it results from the corrosive action of the water on the lead-containing materials from which the parts of the water distribution system are constructed. Water leaving the water treatment plant is usually relatively lead-free. However, pipes, solder, fluxes, and alloys containing lead, e.g., brass and bronze fittings, are corroded by water with the result that lead is ultimately a contaminant of the water as it issues from the consumer's tap.

Lead levels in drinking water are a complicated function of the specific quality of the water, i.e., its corrosivity, the materials comprising the distribution and household plumbing systems, pipe geometry, the length of time the water is in contact with the plumbing materials, water temperature, nature of the pipe deposit, and other factors. All of these variables help to establish the ultimate amount of lead contamination and the corresponding risk to human health.

Lead has been used in water distribution systems since ancient times, particularly because its passive oxides make it highly resistant to corrosion and attack by natural waters which it is used to carry. However, even though only minute amounts of lead dissolve in water, lead is an active and accumulative toxicant.

Different factors can accelerate the dissolution of lead in water. For example, lead is subject to corrosion in water at neutral and alkaline pH, and galvanic corrosion can occur at lead/copper joints. It is the corrosion products from galvanic attack that raise lead levels in first-drawn waters that have lain stagnant within household plumbing for a period of time. And, in general, lead concentrations in waters exposed to lead surfaces will be higher in standing water than in flowing water. Lead corrosion increases with the oxygen content of the water.

Hard waters (hardness greater than 120 mg/L $CaCO_3$) are less corrosive to lead than soft waters. The solubility of lead as a function of pH is dependent upon the alkalinity of the drinking water. Soluble lead ($Pb^{+2}$) is the dominate species only when pH and alkalinity are low. In low alkaline waters (less than 50 mg/L $CaCO_3$), total lead concentration is highly pH sensitive. Lead solubility decreases rapidly with increasing pH at low alkalinity. With high alkalinity waters (greater than 100 mg/L $CaCO_3$), the solubility of lead is insensitive to pH over a range of 6.5 to 8. Lead solubility increases with temperature.

The presence of orthophosphate ions in a water-carbonate system has a very large influence on lead solubility. The impact of orthophosphate ions significantly changes the broad generalization of pH and alkalinity on lead solubility, since a number of sparingly soluble lead phosphate compounds can be formed, many of which have much lower solubilities than lead carbonates. But, in high-hardness, high-alkaline waters, the addition of orthophosphate to control lead may be limited.

Polyphosphate (metaphosphate and pyrophophate) considerably inhibit lead solubility compared to control, but are less effective than orthophosphate.

2. Brief Description of the Prior Art

There are relatively few options available to minimize lead and/or control corrosion/scale in both the distribution and house plumbing systems. These include the use of lead-free solders, replacing lead lines, flushing the system prior to use, and chemical treatment. Chemical treatment can consist of pH control, alkalinity control, and the addition of specific corrosion inhibitors. The present invention is concerned with the last option, and chemical treatments of this type which have been utilized heretofore will be briefly described.

The most effective means to reduce both lead solubility and provide corrosion control to the overall distribution system is through the use of chemical treatments. There have been three basic building blocks used in potable water systems: orthophosphate, polyphosphate and silicates, all with or without zinc.

The use of orthophosphate has reduced lead solubility in both low- and high-alkalinity waters. An orthophosphate concentration of approximately 1 to 2 mg/L $PO_4$ can be effective in reducing lead solubility over a much lower pH range than would be possible by using pH-carbonate adjustment.

Adding zinc/polyphosphate to municipal distribution systems has been an effective treatment program for controlling corrosion and scale, as well as stabilizing iron and manganese. Although polyphosphates are not as effective as orthophosphate in reducing lead solubility, the use of zinc/polyphosphate has broad applicability. The effective pH range is 6 to 7.5, but maintaining the pH above neutral is recommended.

Treatments utilizing silicates appear to have a retarding effect on lead solubility, but require a relatively long period of time, approximately 8 to 9 months, to show reductions in lead concentrations. This long-term effect can be explained by the slow formation of a kinetically-inhibited lead silicate film. Silicate treatments, however, are not recommended for control of lead solubility in distribution systems.

Further details regarding the above known chemical treatments to reduce lead solubility may be found in Boffardi, "Minimization of Lead Corrosion in Drinking Water", *Materials Performance*, 29(8), 45 (1990).

Moran et al., U.S. Pat. No. 4,613,450 discloses corrosion inhibitors comprising members of the fluorophosphate family, including sodium monofluorophosphate. However, these are said to be useful for protecting metallic surfaces of installations and devices using water as energetic or thermic fluid, i.e., for heating and cooling. The only metals which are mentioned are iron and its alloys, particularly galvanized steel, copper and its alloys, and aluminum and its alloys. Thus, there is no suggestion of the use of sodium monofluorophosphate to inhibit the solubility of lead in potable water sources.

Sodium monofluorophosphate is the most widely accepted dentifrice additive to reduce dental decay. In aqueous solution as well as in a paste, it has been reported to be effective in treating sensitive teeth.

SUMMARY OF THE INVENTION

The present invention relates to a method of reducing the amount of soluble lead in a potable water source comprising treating said water with an effective amount of sodium monofluorophosphate. In particular, the present invention relates to such a treatment method in which the amount of sodium monofluorophosphate is sufficient to achieve a concentration of 0.1 to 500 mg/L, and preferably 1 to 50 mg/L in the potable water source.

The present invention further relates to a method of reducing the amount of soluble lead in a potable water source while at the same time providing anticaries effective fluoride in said water, comprising treating said water with an effective amount of sodium monofluorophosphate. In particular, the present invention relates to such a treatment method in which the amount of sodium monofluorophosphate is sufficient to achieve a concentration of 0.1 to 500 mg/L, and preferably 1 to 50 mg/L in the potable water source.

DETAILED DESCRIPTION OF THE INVENTION

The monofluorophosphates useful in the method of the present invention all have $PO_3F^{-2}$ as the anion portion of the total salt. This is the active ionic component with respect to providing the benefits of the method of the present invention in reducing the amount of lead in a potable water source, and also providing anticaries effective fluoride in said water. The cation portion of the total salt is relatively unimportant, except with respect to solubility, which, it will be appreciated, is critical to the method of the present invention, since it requires the addition of the monophosphate salt to potable water sources. Thus, the most soluble salt forms will generally be the most preferred for use in the method of the present invention.

The cation portion is selected from the alkali metals Li, Na, K and $NH_4$, the alkaline earth metals Mg, Ca and Ba, or combinations of these. Since the $PO_3F^{-2}$ anion portion has a $-2$ valency, the most common alkali metal salt forms will simply have two cations of the same metal, e.g., $Na_2PO_3F$, which is the most soluble and the most preferred form for use in the method of the present invention. The alkali metals may be different, e.g., $LiNaPO_3F$ or $NaKPO_3F$. Where the alkaline earth metals are present, only one is necessary because they have a $+2$ valency. Thus, $MgPO_3F$ may be used. Combinations of the alkali and alkaline earth metals are possible, e.g., $Na_2Mg(PO_3F)_2$, but these are less preferred forms.

The most preferred monofluorophosphate for use in the method of the present invention, sodium monofluorophosphate, is a stable, white, finely divided solid which melts at about 625° C. with slow decomposition or hydrolysis. It is soluble in water: 42 g per 100 g saturated solution at 25° C. Dilute solutions are stable indefinitely. Accordingly, such a material can be added directly to a potable water source in the amount required to reduce lead solubility as well as to provide fluoride to achieve an anticaries effect.

The amounts of sodium monofluorophosphate that are required to be added for the desired maximum lead solubility reduction will be such as to provide an ultimate concentration in the potable water of between 0.1 and 500 mg/L, and preferably this concentration will be between 1 and 50 mg/L. Most preferably the concentration will be between 5 and 10 mg/L, although it is understood that many factors, of the type which have been explained in detail with regard to the background to the present invention, will determined the actual amount of sodium monofluorophosphate which will be added to any particular potable water source in order to achieve the maximum amount of reduction of lead solubility in that water system. The calculation of those amounts will be well within the skill of the artisan in this field.

The amounts of sodium monofluorophosphate that are required to be added for the desired maximum lead solubility reduction will not be such as to provide the extent of anticaries effect that is normally desired when water is fluoridated, e.g., in conventional municipal water treatment. However, the use of sodium monofluorophosphate in treating potable water sources in the amounts which have been described herein will be sufficient to provide a substantial fluoride content in the water. Thus, sodium monofluorophosphate treatment provides a substantial supplement to conventional fluoridation treatments and will therefore provide a considerable economic benefit to be derived from the reduction in the extent of such conventional fluoridation treatment which is required.

The manner of addition of the sodium monofluorophosphate to the potable water source will also be straightforward to a person of ordinary skill in this art. It may be added in finely subdivided solid form by mechanical dispensers of known design. It may also be added in solid form, but in the form of a matrix in which solid particles of the active ingredient are bonded or bound together by a material which is water soluble, or optionally, does not dissolve at all. Such a matrix allows for regular leaching out or dissolving of the active ingredient particles, whereby it is possible to obtain a sustained release and more unvarying concentration of the sodium monofluorophosphate in the water being treated. The sodium monofluorophosphate may also be made up in the form of concentrated solutions for dispensing in liquid form from dispensers well known in the art. It may also be combined with other chemical treatment agents for dispensing to the potable water source; and these in combination may be dispensed in solid or liquid form.

The potable water source which is the subject of the treatment with sodium monofluorophosphate in accordance with the method of the present invention may be any type of drinking water system or source. It may be as simple as a well supplying a single residence, the water of which is treated for the purpose of softening, etc., and there is then added to the chemical agents used in the water treatment, sodium monofluorophosphate, in accordance with the present invention. The same water softening treatment make also be taking place in the context of an individual dwelling, but one in which the source of the water is a municipal plant or a private water company. Again, however, all that may be involved is to expand that existing treatment program with amounts of sodium monofluorophosphate in accordance with the present invention.

The potable water source may be a major distribution system such as a municipal plant or a private water company. It is in such a setting that economies of scale can truly be realized, and it is in such a setting that the method of the present invention find its preferred application.

EXAMPLES OF PREFERRED EMBODIMENTS

The following examples demonstrate the effectiveness of the treatment method of the present invention in reducing lead solubility in water. These examples are illustrative only, and are not intended to be a limitation of the present invention.

EXAMPLE 1

Corrosion tests were performed to determine the efficacy of monofluorophosphate to control lead solubility. Initially, two $1/2 \times 3$ lead coupons were placed in three separate 11 liter baths containing 1X Pittsburgh water (Hardness of 80 mg/L $CaCO_3$, and with the following component concentrations in mg/L: Ca 22, Mg 6, Cl 17.5, $SO_4$ 82, $HCO_3$ 10) controlled at pH 7.5 and 60° C. The three baths contained: 1. No inhibitor; 2.50 mg/L $PO_3F$; and 3.50 mg/L $PO_4$, respectively. Lead concentration in solution was analyzed using the Hach "Leadtrak" test kit. For the control, lead solubility increased linearly with time. After 12 days the lead concentration was 2500 µg/L. With 50 mg/L of $PO_3F$, lead solubility peaked to 100 µg/L after three days and remained at that concentration until the termination of the test. The $PO_4$ evaluation was started eight days later. Therefore, the data encompasses only four days. However, lead levels were essentially negligible, at the limit of dilution of the analytical test.

EXAMPLE 2

Monofluorophosphate was again evaluated for lead control at pH 6. Using similar conditions as in Example 1 above (1X Pittsburgh water, 50° C., pH 6), the control bath contained 15000 µg/L (15 mg/L) of soluble lead after three days. With 50 mg/L $PO_3F$, the lead content in solution was 1500 µg/L. As above, the $PO_4$ system was more effective, suppressing lead solubility to 20 µg/L.

EXAMPLE 3

A final series of tests on lead solubility was conducted in 4X Pittsburgh water (total hardness of 320 mg/L as $CaCO_3$, and with component concentrations 4X those of the 1X Pittsburgh water set out in Example 1 above). Temperature and pH were 50° C. and 7.5, respectively. After three days the control contained 500 µg/L of soluble lead, while 50 mg/L $PO_3F$ controlled lead to 20 µg/L. The 50 mg/L $PO_4$ system contained 150 µg/L of lead. The turbidity of the $PO_4$ system was 27 NTU and 3.5 NTU for the $PO_3F$ system. After seven days the control contained 2400 µg/L lead, while the $PO_3F$ and $PO_4$ contained 44 µg/L (4.2 NTU) and 440 µg/L (35 NTU) respectively.

What is claimed is:

1. A method of reducing the solubilzation of lead in a potable water source including a water distribution system wherein said solubilization results from the corrosive action of said water on lead-containing materials from which the water distribution system included in said potable water source is constructed, comprising treating said water with an amount sufficient to achieve a concentration of 0.1 to 500 mg/L in said water, which is effective to reduce said corrosion, of a monofluorophosphate salt wherein the cation portion thereof comprises one or more members selected from the group consisting of Li, Na, K, $NH_4$, Mg, Ca, and Ba.

2. A method according to claim 1 wherein the monofluorophosphate salt is sodium monofluorophosphate, $Na_2PO_3F$.

3. A method according to claim 2 wherein the amount of sodium monofluorophosphate is sufficient to achieve a concentration of 1 to 50 mg/L in the potable water source.

4. A method according to claim 2 wherein the sodium monofluorophosphate is in solid form and is added to the water as finely subdivided particles.

5. A method according to claim 2 wherein the potable water source is a municipal water system.

* * * * *